(12) United States Patent
Lee et al.

(10) Patent No.: US 11,283,551 B2
(45) Date of Patent: Mar. 22, 2022

(54) METHOD FOR TERMINAL RESENDING DATA IN WIRELESS COMMUNICATION SYSTEM, AND COMMUNICATION DEVICE USING SAME

(71) Applicant: LG Electronics Inc., Seoul (KR)

(72) Inventors: Seungmin Lee, Seoul (KR); Suckchel Yang, Seoul (KR); Seonwook Kim, Seoul (KR); Joonkui Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/473,319

(22) PCT Filed: Jan. 8, 2018

(86) PCT No.: PCT/KR2018/000370
§ 371 (c)(1),
(2) Date: Jun. 25, 2019

(87) PCT Pub. No.: WO2018/128507
PCT Pub. Date: Jul. 12, 2018

(65) Prior Publication Data
US 2019/0372720 A1    Dec. 5, 2019

Related U.S. Application Data
(60) Provisional application No. 62/443,649, filed on Jan. 7, 2017.

(51) Int. Cl.
*H04L 1/18* (2006.01)
*H04W 72/12* (2009.01)
*H04W 72/14* (2009.01)

(52) U.S. Cl.
CPC ....... *H04L 1/1812* (2013.01); *H04W 72/1268* (2013.01); *H04W 72/14* (2013.01)

(58) Field of Classification Search
None
See application file for complete search history.

(56) References Cited

U.S. PATENT DOCUMENTS

| | | | |
|---|---|---|---|
| 10,021,679 B2 * | 7/2018 | Yokomakura | H04W 76/11 |
| 2010/0302983 A1 * | 12/2010 | McBeath | H04L 27/2647 370/311 |

(Continued)

FOREIGN PATENT DOCUMENTS

| | | |
|---|---|---|
| CN | 101119184 A | 2/2008 |
| CN | 101998507 A | 3/2011 |

(Continued)

OTHER PUBLICATIONS

CATT, "NR HARQ Operation," R1-1611397, 3GPP TSG RAN WG1 Meeting #87, Reno, USA, Nov. 5, 2016, see section 2.

(Continued)

*Primary Examiner* — Brian S Roberts
(74) *Attorney, Agent, or Firm* — Dentons US LLP

(57) ABSTRACT

Provided are a method for a terminal resending data in a wireless communication system, and a communication device using same. The method comprises: receiving downlink control information (DCI) from a network; and resending data on the basis of the DCI, wherein the DCI includes an acknowledgement/not-acknowledgement (ACK/NACK) field.

17 Claims, 16 Drawing Sheets

(56) References Cited

U.S. PATENT DOCUMENTS

| | | | | |
|---|---|---|---|---|
| 2011/0171985 | A1* | 7/2011 | Papasakellariou | ........................... H04W 72/0453 455/509 |
| 2012/0155337 | A1* | 6/2012 | Park | ...................... H04W 52/54 370/280 |
| 2013/0044711 | A1* | 2/2013 | Aiba | ................. H04W 72/1289 370/329 |
| 2013/0107809 | A1* | 5/2013 | Ko | ........................ H04L 5/0053 370/328 |
| 2014/0140273 | A1* | 5/2014 | Kim | ...................... H04L 1/1887 370/328 |
| 2014/0153531 | A1* | 6/2014 | Ko | ........................ H04L 1/1854 370/329 |
| 2014/0348056 | A1 | 11/2014 | Feng et al. | |
| 2015/0110034 | A1* | 4/2015 | Yang | ..................... H04L 5/0055 370/329 |
| 2015/0296490 | A1* | 10/2015 | Yi | ....................... H04W 52/281 370/329 |
| 2016/0007374 | A1* | 1/2016 | Lee | ................... H04W 72/0446 370/336 |
| 2016/0019227 | A1* | 1/2016 | Hendrey | ............... G06F 16/248 707/706 |
| 2016/0043831 | A1* | 2/2016 | Seo | ........................... H04L 1/08 714/748 |
| 2016/0066345 | A1 | 3/2016 | Sun et al. | |
| 2017/0171841 | A1* | 6/2017 | Chen | ...................... H04L 1/1854 |
| 2017/0353272 | A1* | 12/2017 | Takeda | .................. H04L 1/1864 |
| 2018/0014298 | A1* | 1/2018 | Sun | ......................... H04L 1/189 |

FOREIGN PATENT DOCUMENTS

| | | |
|---|---|---|
| CN | 102055577 A | 5/2011 |
| CN | 102088343 A | 6/2011 |
| CN | 104081705 A | 10/2014 |
| CN | 104158640 A | 11/2014 |
| CN | 104518856 A | 4/2015 |
| JP | 2016-48881 A | 4/2016 |
| JP | 2016048881 A | 4/2016 |
| WO | WO-2014129848 A1 * | 8/2014 ........ H04W 72/0446 |
| WO | WO-2014142603 A1 * | 9/2014 ........... H04L 1/1607 |
| WO | WO-2015141715 A1 * | 9/2015 ............ H04W 76/14 |

OTHER PUBLICATIONS

Ericsson, "Asynchronous HARQ for PUSCH," R1-1611506, 3GPP TSG RAN WG1 Meeting #87, Reno, USA, Nov. 4, 2016, see section 2.
CATT, "Explicit HARQ and Scheduling Timing Design for LTE sTTI," R1-1611360, 3GPP TSG RAN WG1 Meeting #87, Reno, USA, Nov. 5, 2016, see section 2.
Ericsson, "Asynchronous HARQ for PUSCH," R1-167500, 3GPP TSG RAN WG1 Meeting #86, Goteborg, Swedent, Aug. 12, 2016, see section 2.2.
Samsung: "HARQ-ACK for PUSCH", R1-156745, 3GPP TSG RAN WG1 Meeting #83, Anaheim, USA, Nov. 16-20, 2015.
CMCC: "Discussion on DCI contents for NR PDCCH", R1-1612190, 3GPP TSG RAN WG1 Meeting #87, Reno, USA, Nov. 14-18, 2016.
CMCC: "Introduction of Voice and Video enhancements for LTE", R2-169175, 3GPP TSG RAN WG2 Meeting #96, Reno, USA, Nov. 14-18, 2016.
R2-164022: 3GPP TSG-RAN WG2 #94, "Analysis of the needs in the ARQ in NR," Ericcson, May 23-27, 2016, Nanjing, China (6 Pages).
Renesas Mobile Europe Ltd., "On the need of PHICH enhancements", 3GPP TSG-RAN WG1 Meeting #68, Feb. 6-10, 2012, R1-120386.
NTT DoCoMo, Inc., "Scheduling and HARQ aspects for NR", 3GPP TSG RAN WG1 Meeting #87, Nov. 14-18, 2016, R1-1612719.

* cited by examiner

METHOD FOR TERMINAL RESENDING DATA IN WIRELESS COMMUNICATION SYSTEM, AND COMMUNICATION DEVICE USING SAME

CROSS-REFERENCE TO RELATED APPLICATIONS

This application is the National Stage filing under 35 U.S.C. 371 of International Application No. PCT/KR2018/000370, filed on Jan. 8, 2018, which claims the benefit of U.S. Provisional Application No. 62/443,649 filed on Jan. 7, 2017, the contents of which are all hereby incorporated by reference herein in their entirety.

BACKGROUND OF THE INVENTION

Field of the Invention

The present invention related to wireless communication and, most particularly, to a method for a terminal resending data in a wireless communication system, and a communication device using the same.

Related Art

As more communication devices utilize greater communication capacity, there is a need for improved mobile broadband communication over existing radio access technology. Also, massive machine type communications (MTC), which provides various services by connecting many devices and objects, is one of the major issues to be considered in the next generation communication.

In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present disclosure for convenience.

Meanwhile, retransmission of data through a hybrid automatic repeat request (HARQ) process may also be performed in the NR. However, in the NR, by defining a channel that spreads in system bandwidth units, discussions are being made on a more efficient usage method for using symbols being consumed. And, accordingly, discussions are also being made on a method for performing an HARQ process without adopting a physical HARQ indicator channel (PHICH) in the related art LTE.

Accordingly, the present invention uses downlink control information (DCI) as a retransmission indicator so as to provide a method performed by a terminal (or user equipment (UE)) resending (or retransmitting) data.

SUMMARY OF THE INVENTION

Technical Objects

A technical object that is to be achieved by the present invention is to provide a method for a terminal resending data in a wireless communication system, and a communication device using the same.

Technical Solutions

According to an embodiment of the present invention, provided is a method for retransmitting data of a user equipment (UE) in a wireless communication system. The method is comprising receiving downlink control information (DCI) from a network, and retransmitting data based on the DCI, wherein the DCI includes an acknowledgement/not-acknowledgement (ACK/NACK) field.

Here, the retransmission may be a non-adaptive retransmission.

Here, the DCI may indicate retransmission per hybrid automatic repeat request process identifier (HARQ process ID).

Here, the DCI may indicate retransmission per subframe within a subframe window.

Here, in case a counter field informing a scheduling index within the uplink (UL) grant is defined, the DCI may signal a last counter value.

Here, the counter value may be initialized when the DCI is received.

Here, in case a polling on/off field is defined within the UL grant, and, when a polling on UL grant is received in an $N^{th}$ subframe, an UL grant being the indication target of the DCI that is received after a time point of the $N^{th}$ subframe may correspond to an uplink grant that is received during a duration starting from a reception point of a nearest polling on uplink grant before the $N^{th}$ subframe to an $(N-1)^{th}$ subframe.

Here, the DCI may correspond to a UE-specific DCI or a UE-common DCI.

Here, the DCI may include at least any one of a non-adaptive retransmission on/off field, a non-adaptive retransmission timing field, a redundancy version (RV) field, and an aperiodic channel state information (CSI) transmission request field.

Here, a radio network temporary identifier (RNTI) value being related to a detection of the DCI may be independently signaled.

Here, a transmission-related parameter within a search space for the DCI may be predetermined.

Here, in case the UE receives both the DCI and uplink grant for a same HARQ process ID, retransmission may be performed in accordance with the uplink grant.

Here, an HARQ ACK transmission timing field may be configured per HARQ process ID within the DCI.

Here, an acknowledgement/not-acknowledgement resource indicator (ARI) field may be configured per HARQ process ID within the DCI.

According to another embodiment of the present invention, provided is a communication device comprising a radio frequency (RF) unit transmitting and receiving radio signals and a processor being operatively connected to the RF unit. The processor is configured to receive downlink control information (DCI) from a network, and to retransmit data based on the DCI, wherein the DCI includes an acknowledgement/not-acknowledgement (ACK/NACK) field.

Effects of the Invention

According to the present invention, when the terminal (or user equipment (UE)) performs data retransmission (or resends data), by using DCI as a retransmission indicator, a more efficient retransmission may be performed.

DESCRIPTION OF EXEMPLARY EMBODIMENTS

Figure 1:
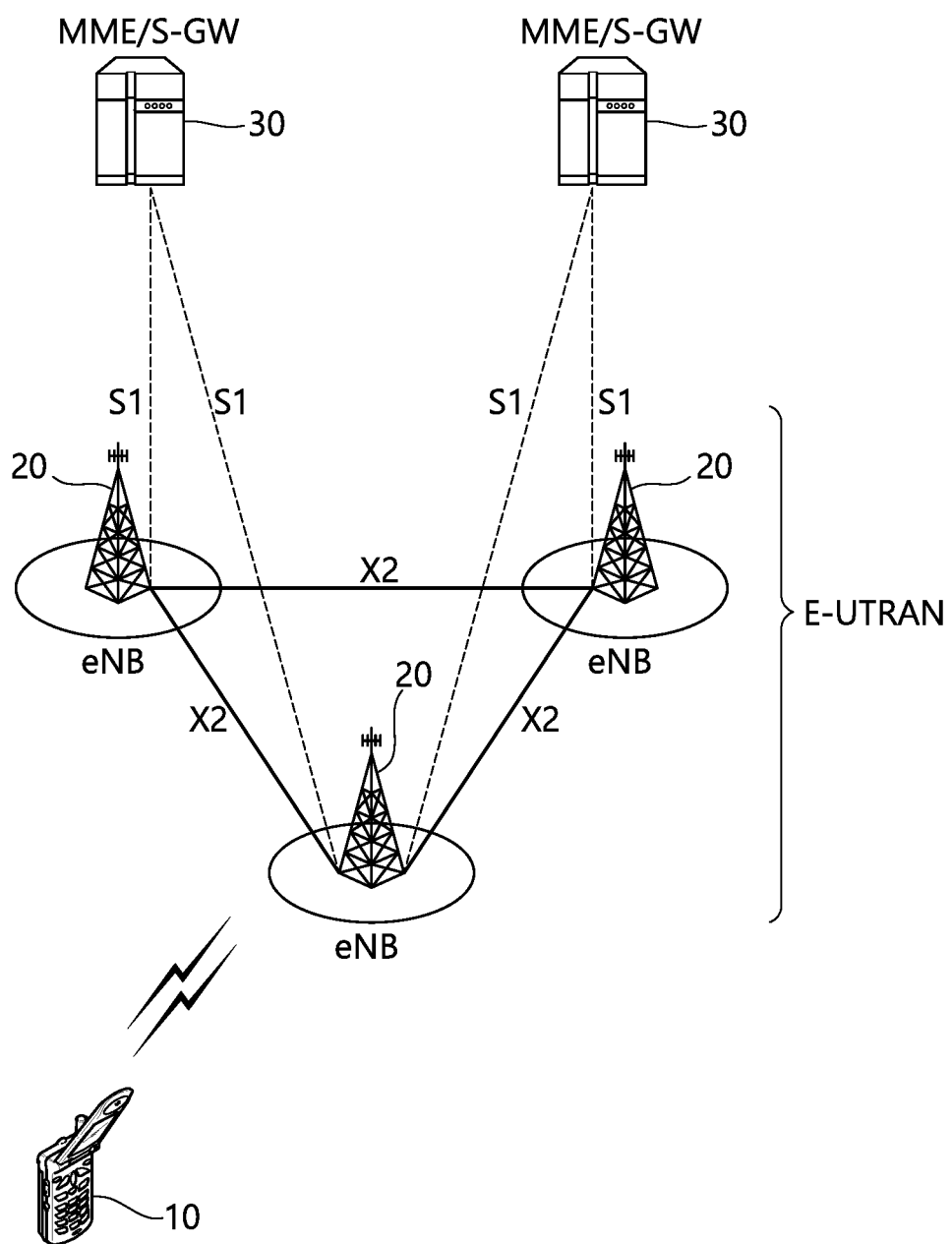
FIG. 1 shows an example of a wireless communication system according to some implementations of the present disclosure.

FIG. 1 shows an example of a wireless communication system according to some implementations of the present disclosure. In some scenarios, the wireless communication system may be compatible with one or more technical standards. For example, in some scenarios, the wireless communication system in FIG. 1 may be referred to as an Evolved-UMTS Terrestrial Radio Access Network (E-UTRAN) or a Long Term Evolution (LTE)/LTE-A system.

In this example, the E-UTRAN includes at least one base station (BS) 20 which provides a control plane and a user plane to a user equipment (UE) 10. The UE 10 may be fixed or mobile, and may be referred to by another terminology, such as a mobile station (MS), a user terminal (UT), a subscriber station (SS), a mobile terminal (MT), a wireless device, etc. The BS 20 is generally a fixed station that communicates with the UE 10 and may be referred to by another terminology, such as an evolved node-B (eNB), a base transceiver system (BTS), an access point, etc.

The BSs 20 may be interconnected by an interface, such as an X2 interface. The BSs 20 may also be connected by an interface, such as an S1 interface, to an evolved packet core (EPC) 30. For example, in some implementations, the BSs 20 may be connected to a mobility management entity (MME) through an interface, such as an S1-MME interface, and to a serving gateway (S-GW) through another interface, such as an S1-U interface.

In some implementations, the EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

A radio interface protocol may be implemented between the UE and the network. Layers of the radio interface protocol between the UE and the network may be classified into a first layer (L1), a second layer (L2), and a third layer (L3), for example, based on the lower three layers of the open system interconnection (OSI) model. Among these, a physical (PHY) layer belonging to the first layer provides an information transfer service by using a physical channel, and a radio resource control (RRC) layer belonging to the third layer serves to control a radio resource between the UE and the network. In some implementations, the RRC layer exchanges an RRC message between the UE and the BS.

Figure 2:
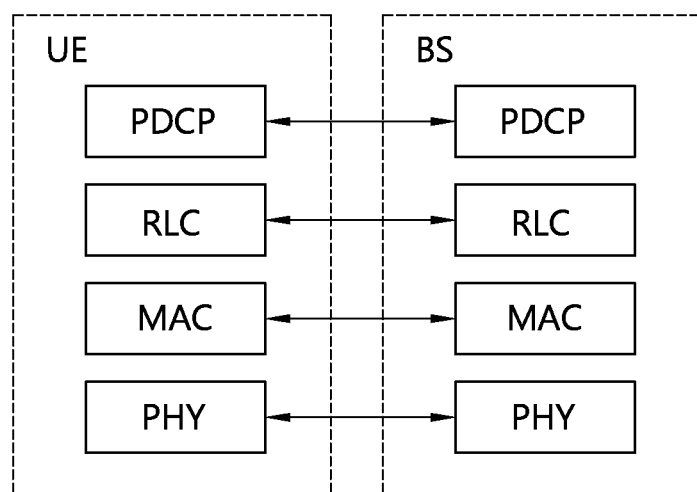
FIG. 2 is a diagram showing an example of a wireless protocol architecture for a user plane.
Figure 3:
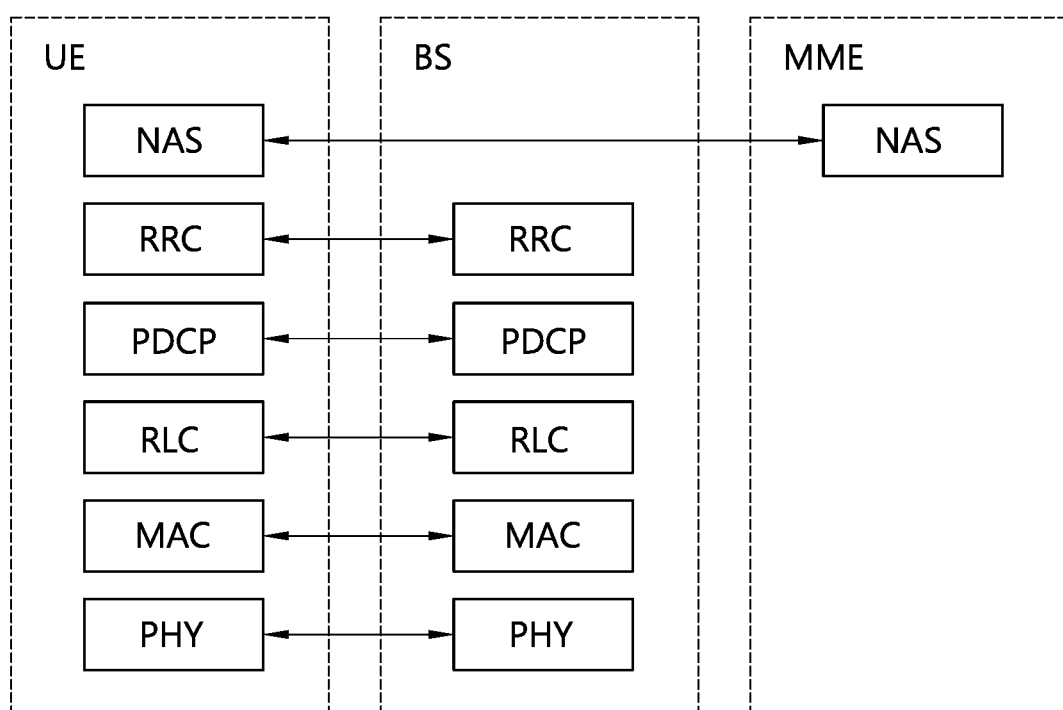
FIG. 3 is a diagram showing an example of a wireless protocol architecture for a control plane.

FIG. 2 is a diagram showing an example of a wireless protocol architecture for a user plane. FIG. 3 is a diagram showing an example of a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer, which is an upper layer of the PHY layer, through a transport channel Data is transferred between the MAC layer and the PHY layer through the transport channel. The transport channel may be classified according to how and with what characteristics data is transferred through a radio interface.

Data is transferred between different PHY layers, for example, between PHY layers of a transmitter and a receiver, through a physical channel. The physical channel may be modulated according to a suitable modulation techniques, e.g., Orthogonal Frequency Division Multiplexing (OFDM), using time and frequency as radio resources.

The functions of the MAC layer include, for example, mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include, for example, concatenation, segmentation, and reassembly of an RLC SDU. In some scenarios, to guarantee various types of Quality of Service (QoS) required by a Radio Bearer (RB), the RLC layer provides three types of operation modes: Transparent Mode (TM), Unacknowledged Mode (UM), and Acknowledged Mode (AM). Among these, in some implementations, AM RLC provides error correction through an Automatic Repeat Request (ARQ).

The RRC layer is defined only on the control plane, according to some implementations. The RRC layer is related to, for example, the configuration, reconfiguration, and release of radio bearers, and is responsible for control of logical channels, transport channels, and PHY channels. An RB is a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes, for example, the transfer of user data and header compression and ciphering. The function of the PDCP layer on the user plane further includes, for example, the transfer and encryption/integrity protection of control plane data.

The process of configuring an RB may include defining the characteristics of a wireless protocol layer and channels in order to provide specific service and configuring each detailed parameter and operating method. An RB may be, for example, a Signaling RB (SRB) or a Data RB (DRB). The SRB is used as a passage through which an RRC message is transmitted on the control plane, and the DRB is used as a passage through which user data is transmitted on the user plane.

If an RRC connection is established between the RRC layer of UE and the RRC layer of an E-UTRAN, then the UE is referred to as being in the "RRC connected state." If not, the UE is referred to as being in the "RRC idle state."

A downlink transport channel through which data is transmitted from a network to UE includes, for example, a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). In some implementations, an uplink transport channel through which data is transmitted from UE to a network includes, for example, a random access channel (RACH) through which an initial control message is transmitted and an uplink shared channel (SCH) through which user traffic or control messages are transmitted.

Logical channels that are implemented over the transport channel, and that are mapped to the transport channel, include, for example, a broadcast control channel (BCCH), a paging control channel (PCCH), a common control channel (CCCH), a multicast control channel (MCCH), and a multicast traffic channel (MTCH).

The physical channel includes several symbols (e.g., OFDM symbols) in the time domain and several subcarriers in the frequency domain. One subframe includes a plurality of OFDM symbols in the time domain. An RB is a unit of resource allocation for the communication system, and includes a plurality of OFDM symbols in the time domain and a plurality of subcarriers in the frequency domain. In some implementations, for each subframe, specific subcarriers of specific OFDM symbols (e.g., the first OFDM symbol) of the corresponding subframe may be allocated for a physical downlink control channel (PDCCH), e.g., an L1/L2 control channel A Transmission Time Interval (TTI) is a unit of time for a single subframe transmission.

Figure 4:
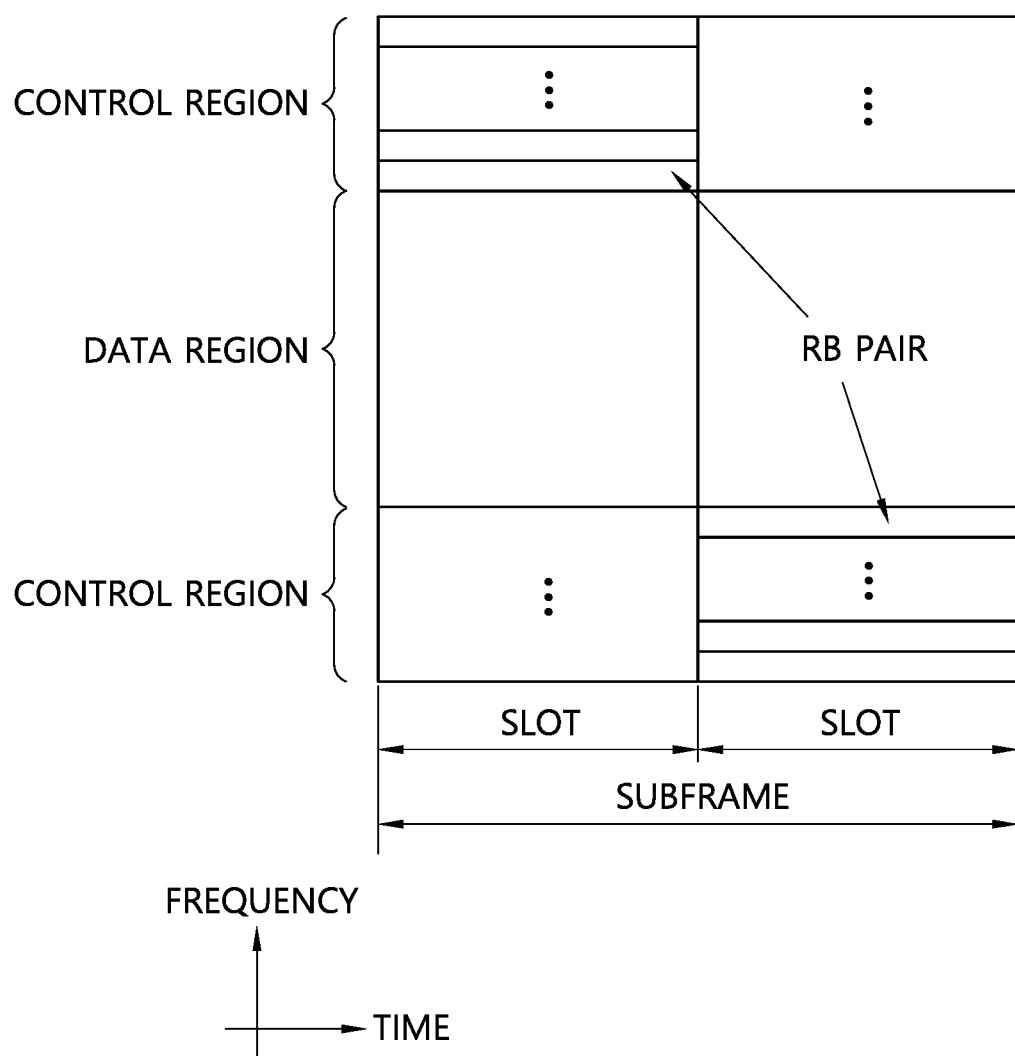
FIG. 4 shows the structure of an uplink subframe in 3GPP LTE.

FIG. 4 shows the structure of an uplink subframe in 3GPP LTE.

The uplink subframe can be divided into a control region and a data region in a frequency domain Physical uplink control channels (PUCCHs) on which uplink control information is transmitted are allocated to the control region. Physical uplink shared channels (PUSCHs) through which data is transmitted are allocated to the data region. A terminal may send or may not send a PUCCH and a PUSCH at the same time depending on a configuration.

A PUCCH for one terminal is allocated as an RB pair in a subframe. RBs belonging to the RB pair occupy different subcarriers in a first slot and a second slot. A frequency occupied by RBs that belong to an RB pair allocated to a PUCCH is changed on the basis of slot boundary. This is called that the RB pair allocated to the PUCCH has been frequency-hopped in the slot boundary. A terminal can obtain a frequency diversity gain by sending uplink control information through different subcarriers over time.

Uplink control information transmitted on a PUCCH includes ACK/NACK, Channel State Information (CSI) indicative of a downlink channel state, a Scheduling Request (SR), that is, an uplink radio resource allocation request, etc. The CSI includes a Precoding Matrix Index (PMI) indicative of a precoding matrix, a Rank Indicator (RI) indicative of a rank value that is preferred by UE, a Channel Quality Indicator (CQI) indicative of a channel state, etc.

A PUSCH is mapped to an uplink shared channel (UL-SCH), that is, a transport channel. Uplink data transmitted on the PUSCH can be a transmission block, that is, a data block for an UL-SCH that is transmitted during a TTI. The transmission block can be user information. Alternatively, the uplink data can be multiplexed data. The multiplexed data can be obtained by multiplexing the transmission block for the UL-SCH and control information. For example, control information multiplexed with data can include a CQI, a PMI, ACK/NACK, an RI, etc. Alternatively, the uplink data may include only control information.

Figure 5:
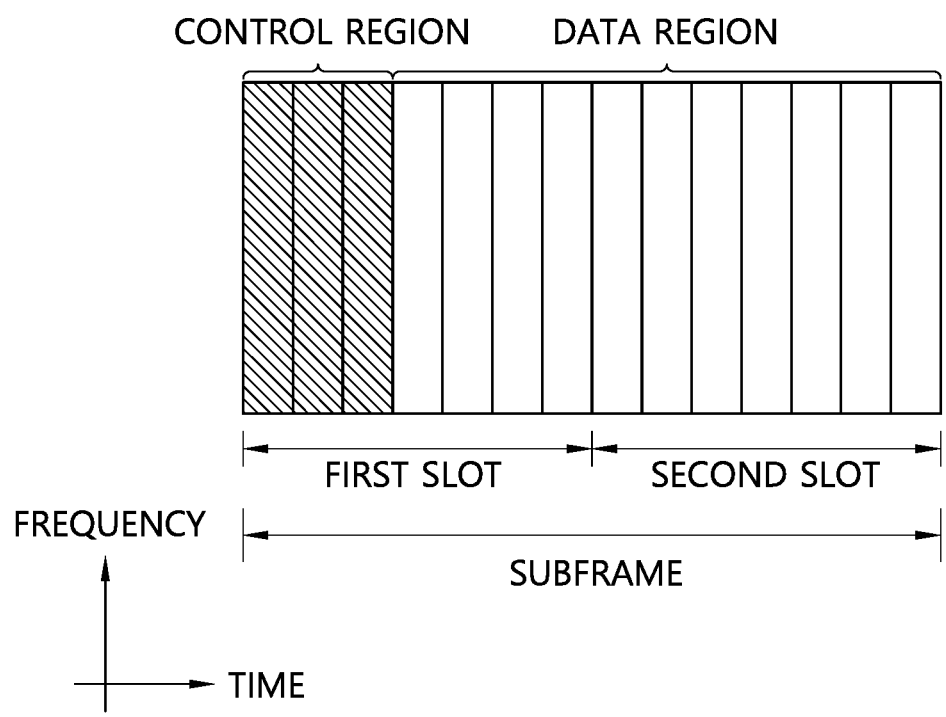
FIG. 5 shows the structure of a downlink subframe in 3GPP LTE.

FIG. 5 shows the structure of a downlink subframe in 3GPP LTE.

The downlink subframe includes two slots in a time domain, and each of the slots includes 7 OFDM symbols in a normal CP. A maximum of former 3 OFDM symbols (i.e., a maximum of 4 OFDM symbols for a 1.4 MHz bandwidth) in the first slot within the downlink subframe corresponds to a control region to which control channels are allocated, and the remaining OFDM symbols correspond to a data region to which Physical Downlink Shared Channels (PDSCHs) are allocated. The PDSCH means a channel on which data is transmitted from a BS or a node to UE.

Control channels transmitted in the control region include a physical control format indicator channel (PCFICH), a physical hybrid-ARQ indicator channel (PHICH), and a physical downlink control channel (PDCCH).

A PCFICH transmitted in the first OFDM symbol of the subframe carries a Control Format Indicator (CFI), that is, information about the number of OFDM symbols (i.e., the size of the control region) that is used to send control channels within the subframe. A terminal first receives a CFI on a PCFICH and then decodes a PDCCH. Unlike a PDCCH, a PCFICH does not use blind decoding, and the PCFICH is transmitted through the fixed PCFICH resource of a subframe.

A PHICH carries an acknowledgement (ACK)/not-acknowledgement (NACK) signal for an uplink Hybrid Automatic Repeat request (HARQ). An ACK/NACK signal for uplink data transmitted by UE is transmitted through a PHICH. The PHICH is described in detail later.

A PDCCH is a control channel on which Downlink Control Information (DCI) is transmitted. The DCI can include the allocation of PDSCH resources (also called downlink grant (DL grant)), the allocation of physical uplink shared channel (PUSCH) resources (also called an uplink grant (UL grant)), a set of transmit power control commands for individual UEs within a specific terminal group and/or the activation of a Voice over Internet Protocol (VoIP).

Figure 6:
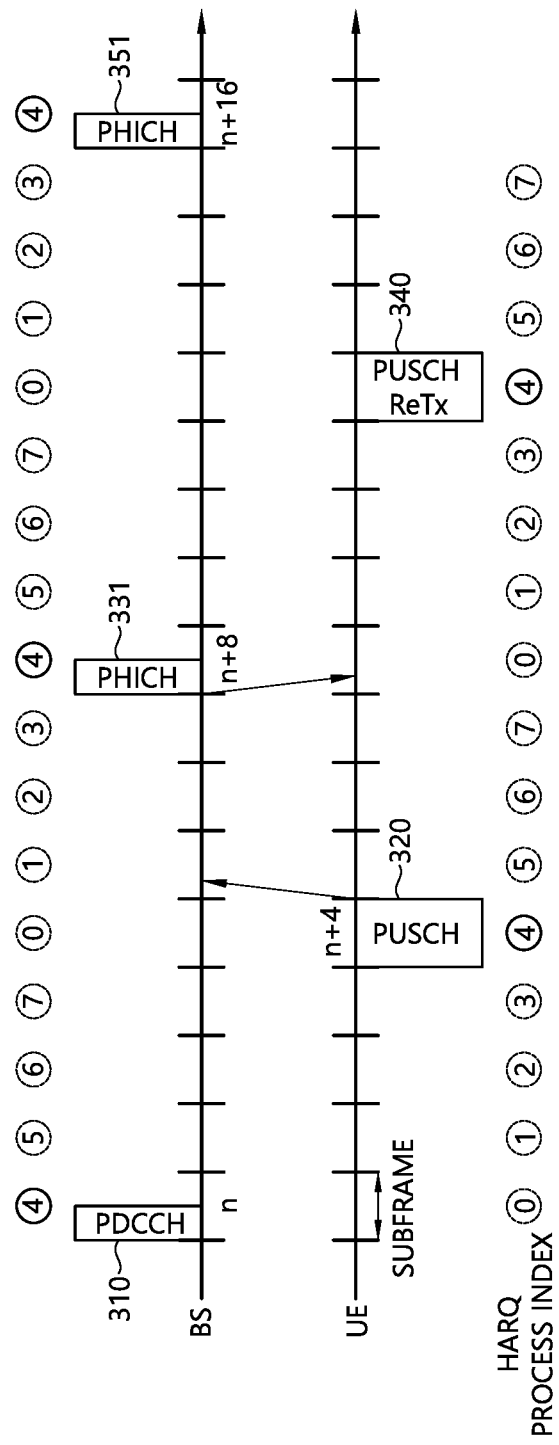
FIG. 6 shows an example of a method of performing an uplink HARQ in 3GPP LTE.

FIG. 6 shows an example of a method of performing an uplink HARQ in 3GPP LTE.

A terminal receives the allocation of initial uplink resources on a PDCCH 310 in an $n^{th}$ subframe from a BS.

The terminal sends uplink data, more particularly, an uplink transmission block on a PUSCH 320 in an $(n+4)^{th}$ subframe using the allocation of the initial uplink resources.

The BS sends an ACK/NACK signal for the uplink transmission block on a PHICH 331 in an $(n+8)^{th}$ subframe. The ACK/NACK signal indicates the confirmation of the reception of the uplink transmission block, the ACK signal indicates successful reception, and the NACK signal indicates unsuccessful reception.

The terminal which has received the NACK signal sends a retransmission block on a PUSCH 340 in an $(n+12)^{th}$ subframe.

The BS sends an ACK/NACK signal for the uplink transmission block on a PHICH 351 in an $(n+16)^{th}$ subframe.

After initial transmission in the $(n+4)^{th}$ subframe, the retransmission is performed in the $(n+12)^{th}$ subframe. Accordingly, an HARQ is performed using 8 subframes as an HARQ cycle.

In 3GPP LTE, 8 HARQ processes can be performed. The HARQ processes are assigned indices from 0 to 7. The aforementioned example shows that an HARQ in an HARQ process index 4.

Hereinafter, new radio access technology (new RAT or NR) will be described.

As more communication devices utilize greater communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present disclosure for convenience.

Figure 7:
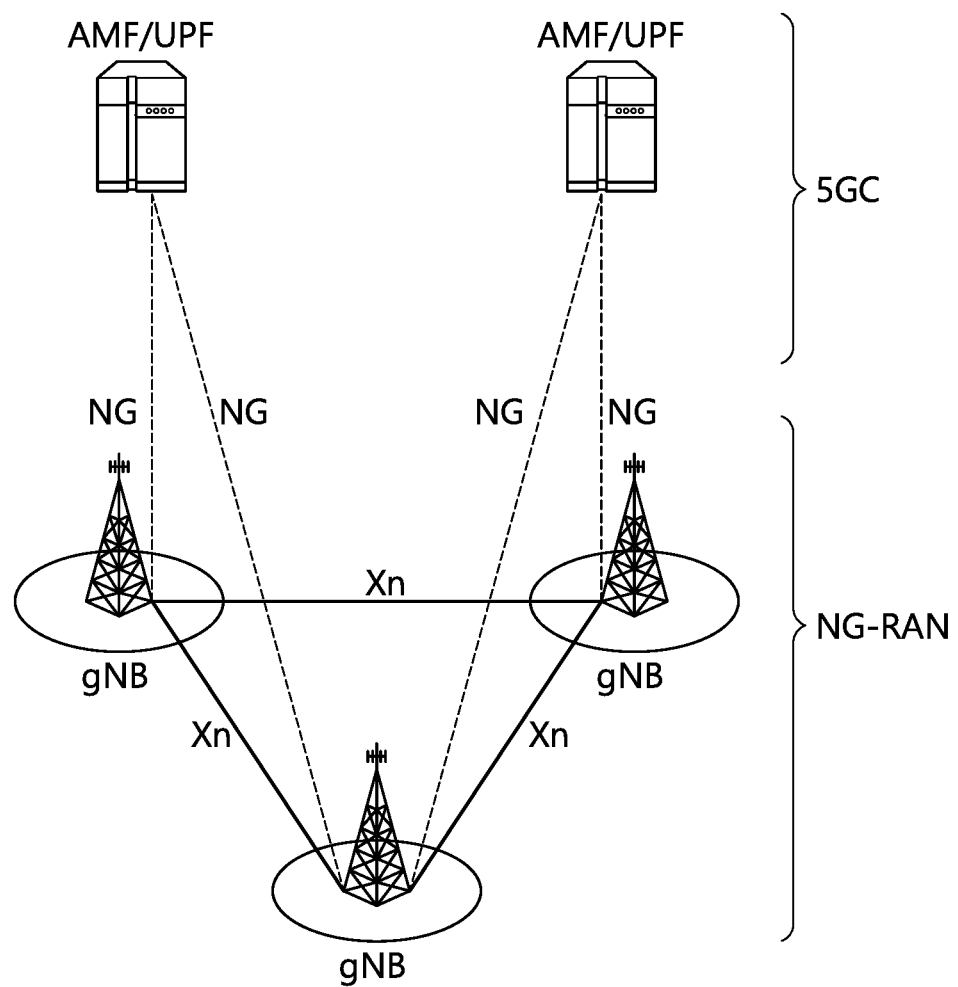
FIG. 7 illustrates a system structure of a next generation radio access network (NG-RAN) according to some implementations of the present disclosure.

FIG. 7 illustrates a system structure of a next generation radio access network (NG-RAN) according to some implementations of the present disclosure.

Referring to the example of FIG. 7, the NG-RAN may include a gNB and/or an eNB that provides user plane and control plane protocol termination to a terminal. The example of FIG. 7 illustrates the case of including only gNBs, but implementations are not limited thereto. The gNB and the eNB are connected by an interface, such as an Xn interface. The gNB and the eNB are connected to a 5G core network (5GC) via an interface, such as an NG interface. In some implementations, the gNB and the eNB are connected to an access and mobility management function (AMF) via an interface, such as an NG-C interface, and are connected to a user plane function (UPF) via another interface, such as an NG-U interface.

Figure 8:
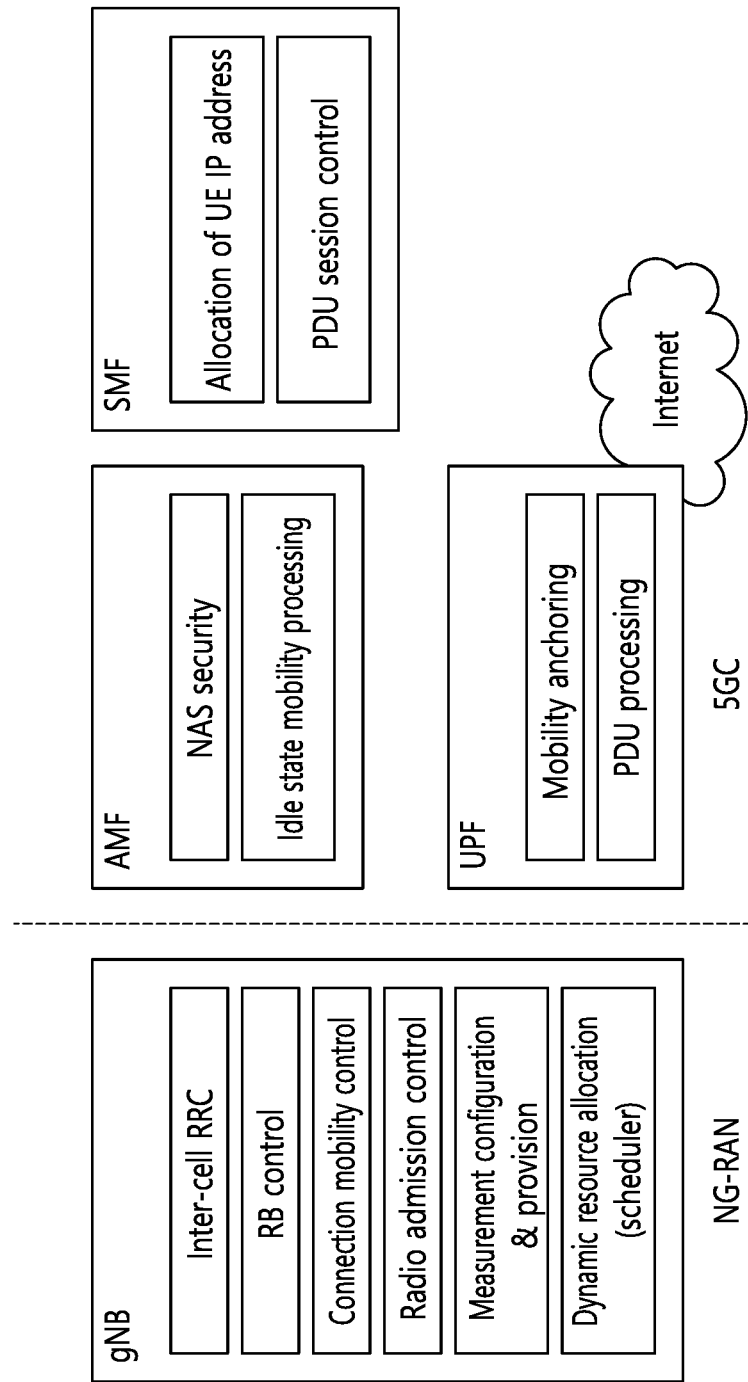
FIG. 8 illustrates an example of a functional division that may be implemented between an NG-RAN and a 5GC.

FIG. 8 illustrates an example of a functional division that may be implemented between an NG-RAN and a 5GC.

According to some implementations, the gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like. The SMF may provide functions such as UE IP address assignment, PDU session control, and so on.

Figure 9:
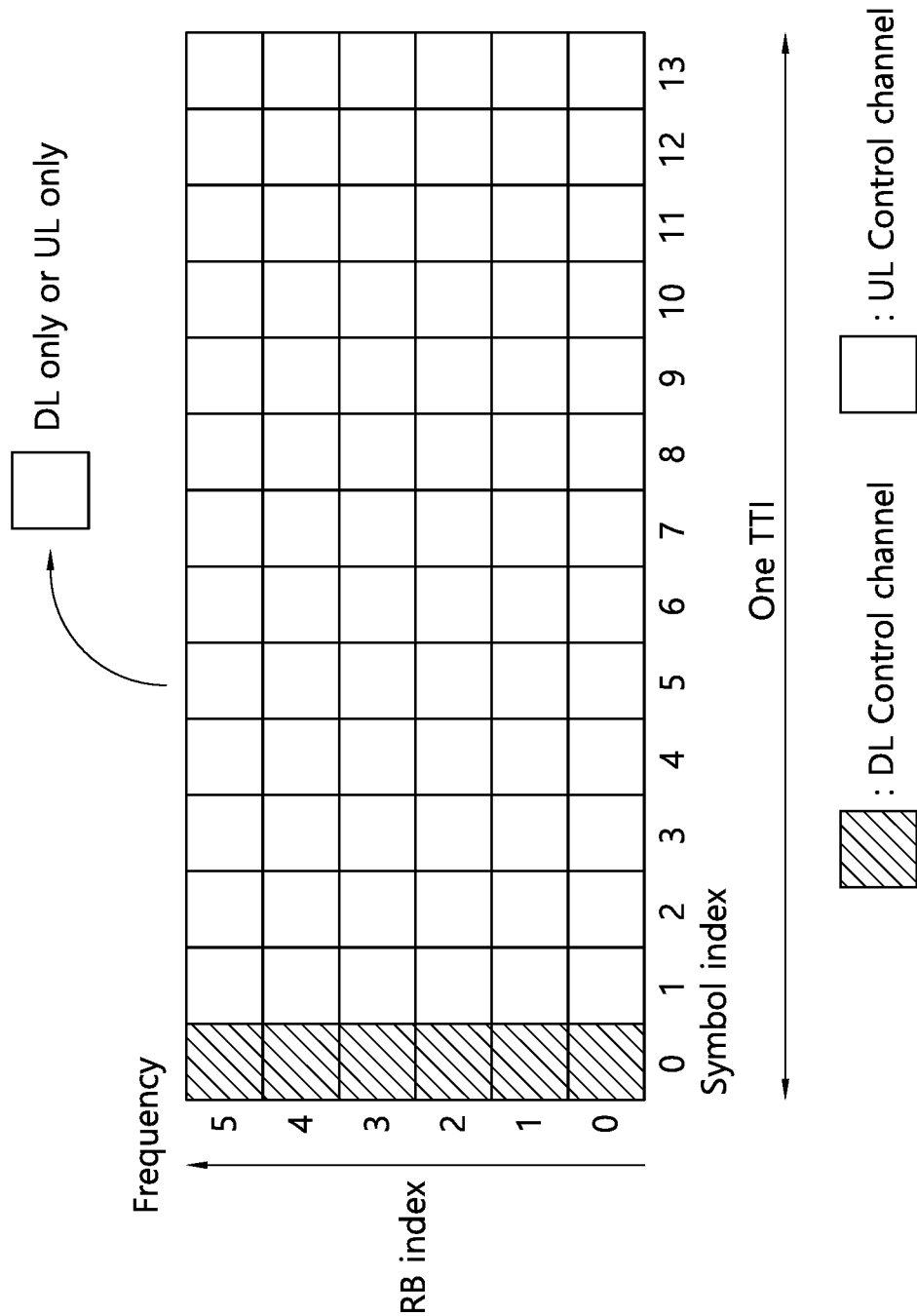
FIG. 9 illustrates an example of a frame structure according to some implementations of the present disclosure.

FIG. 9 illustrates an example of a frame structure according to some implementations of the present disclosure. This frame structure may, for example, by compatible with new radio access technology.

In NR, a structure in which a control channel and a data channel are time-division-multiplexed within one TTI, as shown in FIG. 9, may be implemented as a frame structure. Such frame structure implementations can, in some scenarios, help reduce latency.

In the example of FIG. 9, a shaded region represents a downlink control region and a black region represents an uplink control region. The remaining region may be used for downlink (DL) data transmission or uplink (UL) data transmission. This structure is characterized in that DL transmission and UL transmission are sequentially performed within one subframe and thus DL data can be transmitted and UL ACK/NACK can be received within the subframe. Consequently, in some scenarios, a time period from an occurrence of a data transmission error to a data retransmission may be reduced, thereby reducing latency in data transmission.

In this data and control time-division multiplexed (TDMed) subframe structure, a time gap may be implemented, for a base station and a terminal to switch from a transmission mode to a reception mode or from the reception mode to the transmission mode. To this end, some OFDM symbols at a time when DL switches to UL may be set to a guard period (GP) in the self-contained subframe structure.

Meanwhile, the following techniques may be applied in association with an uplink of the NR.

<PUCCH Formats in the NR>

In NR, PUCCH formats may have the following characteristics.

A PUCCH may deliver uplink control information (UCI). Additionally, PUCCH formats may be differentiated from one another in accordance with a duration/payload size. For example, PUCCH formats may be categorized as a "Short Duration Uplink Control Channel (SHD_PUCCH)" and a "Long Duration Uplink Control Channel (LGD_PUCCH)". The SHD_PUCCH may be referred to as a short PUCCH for simplicity, and, herein, format 0 (≤2 bits) and format 2(>2 bits) may correspond to the short PUCCH. The LGD_PUCCH may be referred to as a long PUCCH for simplicity, and, herein, format 1(≤2 bits), format 3(>2, [>N] bits), and format 4(>2, [≤N] bits) may correspond to the long PUCCH.

Meanwhile, a transmission diversity method for the PUCCH may not be supported in Rel-15. Additionally, synchronized physical uplink shared channel (PUSCH) and PUCCH transmission may not be supported in Rel-15.

Meanwhile, PUCCH formats in the NR may be defined as shown below in Table 1.

TABLE 1

| Format | PUCCH length (Number OFDM of symbols) | Number of bits | Usage example | Other |
|---|---|---|---|---|
| 0 | 1-2 | ≤2 | HARQ, SR | Sequence selection |
| 1 | 4-14 | ≤2 | HARQ, [SR] | Sequence modulation (BPSK, QPSK) |
| 2 | 1-2 | >2 | HARQ, CSI, [SR] | [CP-OFDM] |
| 3 | 4-14 | [>N] | HARQ, CSI, [SR] | DFT-s-OFDM (no UE multiplexing) |
| 4 | 4-14 | >2, [≤N] | HARQ, CSI, [SR] | DFT-s-OFDM (Pre DFT OCC) |

<Uplink (UL) Signal/Channel Multiplexing>

In NR, uplink (UL) signal/channel multiplexing may have the following characteristics.

For the multiplexing of the PUCCH and PUSCH, the following techniques may be supported. For example, a time division multiplexing (TDM) technique (or scheme) may be supported between a short PUCCH (e.g., formats 0/2) and a PUSCH. Additionally, for example, a frequency division multiplexing (FDM) technique (or scheme) may be supported between a short PUCCH (e.g., formats 0/2) corresponding to a slot having a short uplink part (UL-part) of a UE (other than Re-15) and a PUSCH.

For the multiplexing of the PUCCH and PUSCH, the following techniques may be supported. For example, a TDM/FDM technique (or scheme) may be supported between a short PUCCH (e.g., formats 0/2) and a long PUCCH (e.g., formats 1/3/4). Additionally, for example, a TDM technique (or scheme) may be supported between short PUCCHs (e.g., formats 0/2) within the same slot of a single UE. Furthermore, for example, a TDM technique (or scheme) may be supported between a short PUCCH (e.g., formats 0/2) and a long PUCCH (e.g., formats 1/3/4) within the same slot of a single UE.

As described above, FIG. 10 shows an example of a multiplexing scheme within a single slot in the NR.

Figure 10:
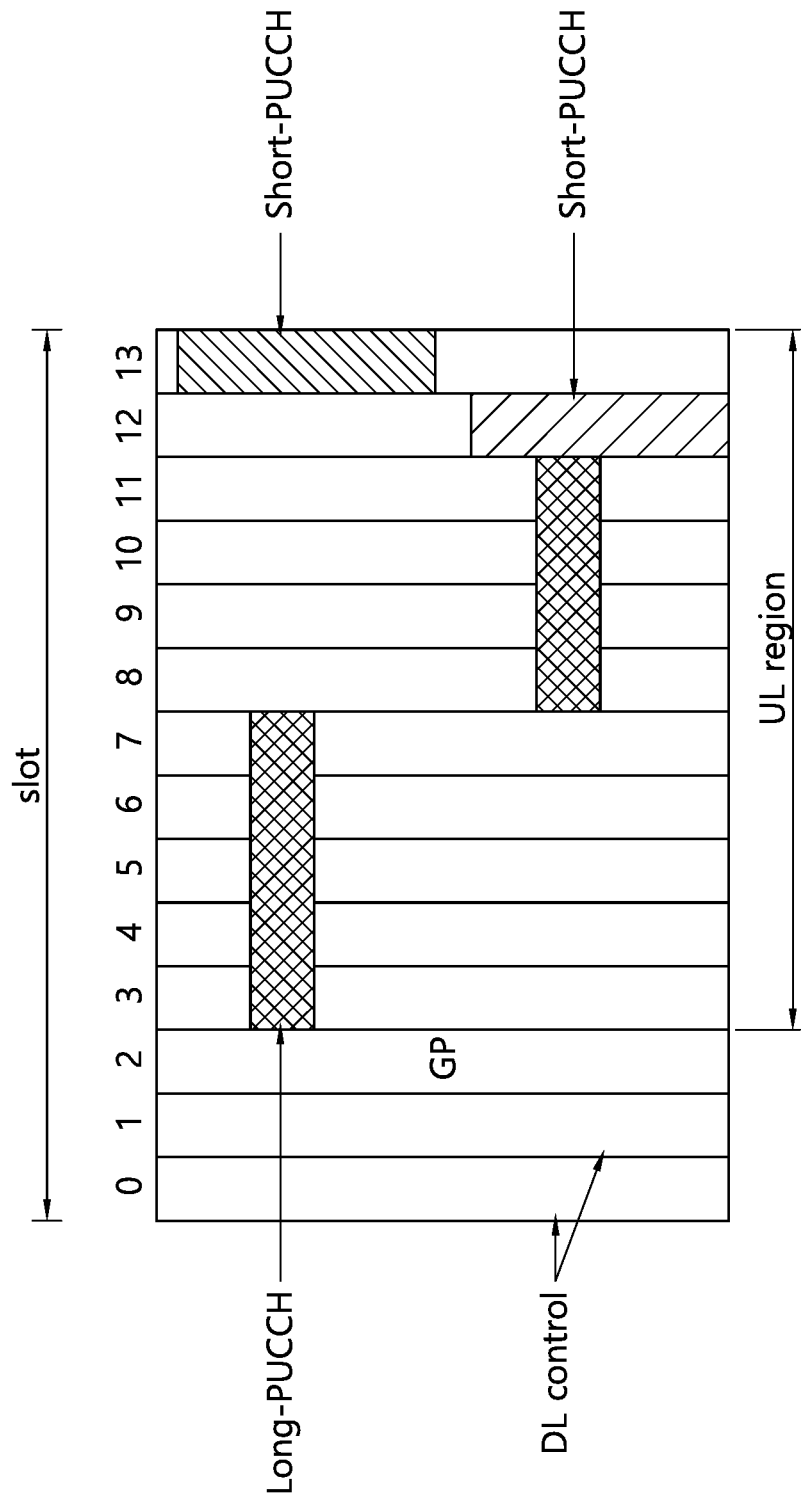
FIG. 10 shows an example of a multiplexing scheme within a single slot in the NR.

Referring to FIG. 10, FIG. 10 shows an example wherein the long-PUCCH is positioned in different frequency bands from symbol #3 to symbol #7 and from symbol #8 to symbol #11 in an uplink (UL) region within a single slot. And, FIG. 10 also shown an example wherein each of the short PUCCHs is respectively positioned in symbol #12 and symbol #13. More specifically, FIG. 10 shows an example wherein TDM is performed between short PUCCHs, and wherein TDM/FDM is performed between a short PUCCH and a long PUCCH.

<Control Information Modulation and Coding Scheme (MCS) Offset>

In NR, semi-persistent and dynamic indication may both be supported for a beta-offset. Additionally, for a dynamic beta-offset indication, a plurality of beta-offset value sets may be configured by RRC signaling, and a UL grant may dynamically indicate an index for a set. Herein, each set may include a plurality of entries, and each entry may correspond to each UCI type (including a case where a two-part CSI can be applied).

<UCI Mapping>

For slot-based scheduling, a PUSCH may be processed with rate-matching for an HARQ-ACK exceeding 2 bits, and the PUSCH may be processed with puncturing for an HARQ-ACK less than or equal to 2 bits.

In NR, a case where downlink (DL) assignment is later than a UL grant, which is mapped to a same time instance for an HARQ-ACK transmission within the PUSCH, may not be supported.

Additionally, UCI (e.g., HARQ-ACK or CSI), which is piggy-backed within the PUSCH, may be mapped to REs that are dispersed and distributed throughout RBs being assigned to the PUSCH.

Regardless of HARQ-ACK puncturing or PUSCH rate-matching, the same RE mapping rule may be applied to the HARQ-ACK piggy-back within the PUSCH. For example, localized mapping or distributed mapping may be performed adjacent to the DM-RS within the time domain.

<Scheduling/HARQ Timing>

In NR, scheduling/HARQ timing may have the following characteristics.

For dynamic indication of scheduling/HARQ timing, slot timing between A and B may be indicated by a field within the DCI from a set of values, and the set of values may be configured by UE-specific RRC signaling. Herein, all Rel. 15 UEs may support a minimum value of K0, such as 0.

Meanwhile, K0 to K2 for A and B may be defined as shown below in Table 2.

TABLE 2

| A | B |
|---|---|
| K0 Downlink scheduling DCI | Corresponding downlink data transmission |
| K1 Downlink data reception | Corresponding HARQ-ACK |
| K2 Uplink scheduling DCI | Corresponding uplink data transmission |

A UE processing time capability may be indicated in symbols (N1, N2). Herein, N1 may indicate a number of OFDM symbols that are needed for the processing of the UE starting from an end of an NR-PDSCH reception to an earliest possible start of its respective ACK/NACK transmission in the viewpoint of the UE. And, N2 may indicate a number of OFDM symbols that are needed for the processing of the UE starting from an end of an NR-PDCCH including a UL grant reception to an earliest possible start of its respective NR-PUSCH transmission in the viewpoint of the UE.

Minimum values of (K1, K2) of the UE may be determined based on (N1, N2), a timing advance (TA) value, UE DL/UL switching, and so on.

Meanwhile, in the NR, two types of UE processing time capabilities may be defined for slot based scheduling corresponding to a case of a non-CA using a single numerology for at least PDCCH, PDSCH, and PUSCH.

For example, for the given settings and numerology, the UE may indicate only one capability for N1 (or N2) based on an entry of the corresponding N1 (or N2) from the two following tables (Table 3, Table 4).

Capability #1 (Table 3): UE Processing Time Capability

TABLE 3

| Settings | HARQ timing parameter | Units | 15 KHz SCS | 30 KHz SCS | 60 KHz SCS | 120 KHz SCS |
|---|---|---|---|---|---|---|
| Front-loaded DMRS only | N1 | Symbols | [8] | [10] | [14] | [14-21] |
| Front-loaded + additional DMRS | N1 | Symbols | [13] | [13] | [17] | [21] |
| Frequency-first RE-mapping | N2 | Symbols | [9] | [11] | [17] | [31] |

Capability #2 (Table 4): Active UE Processing Time Capability

TABLE 4

| Setup | HARQ timing parameter | Units | 15 KHz SCS | 30 KHz SCS |
|---|---|---|---|---|
| Front-loaded DMRS only | N1 | Symbols | [2.5-4] | [2.5-6] |
| Front-loaded + additional DMRS | N1 | Symbols | [12] | [12] |
| Frequency-first RE-mapping | N2 | Symbols | [2.5-6] | [2.5-6] |

For mixed numerologies and scheduling/HARQ timing, when the numerologies between a PDCCH and a transmission being scheduled by the PDCCH are different from one another, for K0 or K2, a time granularity indicated by the DCI may be based on the scheduled transmission.

HARQ-ACK transmission being associated with a plurality of DL element carriers operating based on the same or different numerology may be supported. A time granularity indicated by the DCI scheduling the PDSCH may be based on the numerology of a PUCCH transmission.

<Code Block Group (CBG) Based (Re-)Transmission>

Synchronization: A partial transport block (TB) retransmission may derive an efficient usage of resource. The retransmission unit may correspond to a code block group (CBG). However, when this method is used, HARQ-ACK feedback bits and DCI overhead may be increased.

Code block group (CBG) configuration: The UE may be semi-persistently configured, so as to be capable of performing CBG based retransmission via RRC signaling. A maximum value N of a CBG per TB may be set up by RRC signaling. In case of a single codeword (CW), the maximum value of the CBG per TB that can be set up may be equal to 8. In case of multiple CWs, the maximum value of the CBG per TB that can be set up may be equal to 4, and the set up maximum value of the CBG per TB may be the same in each TB.

At least in case of a single CW, the number of CBGs in a TB may be equal to min(C, N), and, herein, C may indicate a number of CBs within the TB. Among a total of M number of CBGs, a first Mod(C, M) CBG may include a ceil(C/M) CB per CBG. The remaining M-Mod(C, M) CBG may include a floor(C/M) CB per CBG.

In relation with the DCI, CBG transmission information (CBGTI) and CBG flushing out information (CBGFI) may be adopted. CBGTI: A CBG may be (re-)transmitted, and this may correspond to N bits of the CBGTI, which is configured by RRC. CBGFI: The CBG may be processed different for soft-buffer/HARQ combining, and this may correspond to another 1 bit (in case of at least a single CW) for the CBGFI.

For the downlink data, the CBGTI and the CBGFI may be included in the same DCI. In Mode 1, the DCI may include the CBGTI. In Mode 2, the DCI may include both the CBGTI and the CBGFI.

For the uplink data, the CBGTI may be configured to be included in the DCI. In Mode 1, the DCI may include the CBGTI.

In the HARQ-ACK feedback, for an initial transmission and a retransmission, the same set of CB(s) may exist in each CBG of the TB. When a CBG based retransmission is configured, the UE may use a TB-level HARQ-ACK feedback for a PDSCH, which is scheduled by the PDCCH using fallback DCI, at least in a case where HARQ-ACK multiplexing is not performed. This may indicate that the fallback DCI does not support CBG-level HARQ-ACK feedback.

For a semi-persistent HARQ-ACK codebook, the HARQ-ACK codebook may include HARQ-ACKs corresponding to all of the configured CBGs (including CBGs that are not scheduled). If the same CBG is successfully decoded, an ACK may be reported for the corresponding CBG. If a TB CRC is not passed while a CB CRC check is passed for all CBs, a NACK may be reported for all CBGs. If a number of CBs for the TB is smaller than a pre-determined maximum number of CBGs, a NACK may be mapped to a blank CBG index.

Hereinafter, the present invention will be described in detail.

As described above, in the NR, discussions are being made based on a communication system design considering services/terminals (or UEs) that are sensitive to reliability and latency. And, additionally, discussions are also being made on an introduction of a next generation radio access technology considering Ultra-Reliable and Low Latency Communication (URLLC), and so on.

Meanwhile, retransmission of data through a hybrid automatic repeat request (HARQ) process may also be performed in the NR. However, in the NR, by defining a channel that spreads in system bandwidth units, discussions are being made on a more efficient usage method for using symbols being consumed. And, accordingly, discussions are also being made on a method for performing an HARQ process without adopting a physical HARQ indicator channel (PHICH) in the related art LTE.

Accordingly, the present invention uses downlink control information (DCI) as a retransmission indicator so as to provide a method performed by a terminal (or user equipment (UE)) resending (or retransmitting) data.

For example, the methods proposed below respectively propose methods for efficiently triggering retransmission for a plurality of (uplink (UL)/downlink (DL)) data (synchronously). Herein, for example, (part of) the proposed methods of the present invention may be extendedly applied for uplink (UL) communication (and/or downlink (DL) communication) and/or "non-adaptive retransmission (NA-RETX)" (For example, the retransmission operation may be performed based on an HARQ feedback channel being related to whether or not data reception is successful. More specifically, it may be understood that, instead of (additionally) transmitting a retransmission-related scheduling grant, scheduling information being related to the initial transmission is also (fully or partly) used for the retransmission.) (and/or "adaptive retransmission (A-RETX)" (For example, the retransmission operation may be performed based on a retransmission-related scheduling grant (and/or an HARQ feedback channel being related to whether or not data reception is successful). More specifically, it may be understood that the (additionally transmitted) retransmission-related scheduling grant is used for the retransmission).). Herein, for example, "non-adaptive retransmission (NA-RETX)" wording used in the present invention may be (extendedly or interchangeably) understood (or interpreted as) "adaptive retransmission (A-RETX)" wording. Additionally, "retransmission indication" wording used in the present invention may be extendedly understood (or interpreted as) a "new transport block (TB) indication".

Figure 11:
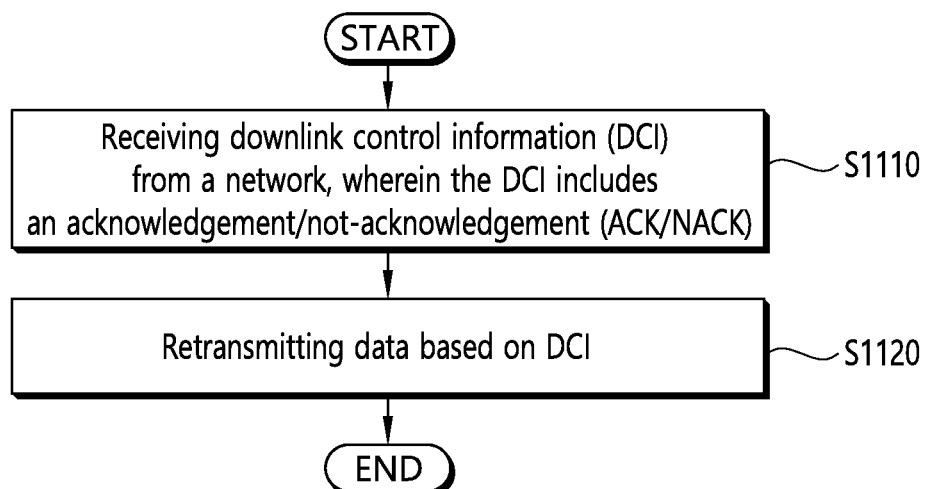
FIG. 11 is a flow chart showing a method for retransmitting data of a UE according to an exemplary embodiment of the present invention.

FIG. 11 is a flow chart showing a method for retransmitting data of a UE according to an exemplary embodiment of the present invention.

According to FIG. 11, a user equipment (UE) receives downlink control information (DCI) from a network (S1110). At this point, the DCI includes an acknowledgement/not-acknowledgement (ACK/NACK) field or a retransmission indication field.

Thereafter, the UE retransmits data based on the DCI (S1120). Herein, for example, the retransmission may correspond to non-adaptive retransmission. Additionally, for example, the DCI may indicate retransmission per HARQ process ID. Additionally, for example, the DCI may indicate retransmission per subframe within a subframe window. Additionally, for example, in case a counter field indicating a scheduling index within the uplink (UL) grant is defined, the DCI may signal a last counter value. Additionally, for example, in case a polling on/off field is defined within the UL grant, and, when a polling on UL grant is received in an $N^{th}$ subframe, an UL grant being the indication target of the DCI that is received after a time point of the $N^{th}$ subframe may correspond to an uplink grant that is received during a duration starting from a reception point of a nearest polling on uplink grant before the $N^{th}$ subframe to an $(N-1)^{th}$ subframe. Additionally, for example, the DCI may correspond to a UE-specific DCI or a UE-common DCI. Additionally, for example, the DCI may include at least any one of a non-adaptive retransmission on/off field, a non-adaptive retransmission timing field, a redundancy version (RV) field, and an aperiodic channel state information (CSI) transmission request field. Additionally, for example, a radio network temporary identifier (RNTI) value that is related to the detection of the DCI may be independently signaled. Additionally, for example, a transmission-related parameter within a search space for the DCI may be predetermined in advance. Additionally, for example, in case the UE receives both the DCI and uplink grant for the same HARQ process ID, retransmission may be performed in accordance with the uplink grant. Additionally, for example, an HARQ ACK transmission timing field may be configured per HARQ process ID within the DCI. Furthermore, for example, an acknowledgement/not-acknowledgement resource indicator (ARI) field may be configured per HARQ process ID within the DCI.

Hereinafter, a detailed example of a method for retransmitting data of the user equipment (UE) according to FIG. 11 will be described in detail.

As described above, the UE receives the downlink control information (DCI) from a network and retransmits data based on the DCI. Herein, the DCI may include an acknowledgement/not-acknowledgement (ACK/NACK) field. In other words, in the related art 3GPP LTE, although the UE has received an ACK/NACK over a PHICH, instead of doing so, in the present invention, the UE receives DCI including an ACK/NACK field and then performs an HARQ process for the data based on the received DCI. Additionally, the re-transmission may correspond to a non-adaptive retransmission. Hereinafter, a detailed example of this procedure will be described below.

[Proposed Method #1] For example, when NA-RETX for a plurality of (uplink) data are (synchronously) triggered by a single (pre-defined) indicator (e.g., "DCI") (NA-RETX-INDI), (part of) the following rules may be applied.

As described above, the DCI may indicate retransmission per hybrid automatic repeat request process identifier (HARQ process ID). Hereinafter, a detailed example of this procedure will be described below.

(Example #1-1-1) For example, the NA-RETX may be indicated per HARQ PROCESS (GROUP) ID.

Herein, for example, in case the corresponding rule is applied, a field (or fields) for NA-RETX indication per HARQ PROCESS (GROUP) ID within the NA-RETXINDI may be defined.

Herein, for example, interconnected HARQ PROCESS (GROUP) IDs per field (index) may be configured in accordance with a pre-defined rule (e.g., a structure of (implicitly) mapping a relatively low (or high) HARQ PROCESS (GROUP) ID to a relatively low field index) and/or may be signaled (e.g., RRC SIGNALING) (from the base station).

As described above, the DCI may indicate retransmission per subframe within a subframe window. Additionally, in case a counter field indicating a scheduling index within the uplink (UL) grant is defined, the DCI may signal a last counter value. In other words, for example, when the counter value of the UL grant is equal to 5, a number of UL grants corresponding to the counter value may become targets of retransmission triggering. Herein, whether or not retransmission of the uplink data is actually required in the network is not considered.

Additionally, when the DCI is received, the counter value may be initialized. In other words, in case of a transmission that is based on the above-described counter value, retransmission may be excessively required for the data being actually received by the network. Herein, excessive retransmission, as shown in the above-described example, may be prevented by using the DCI that initialized the counter value.

Additionally, in case a polling on/off field is defined within the UL grant, and, when a polling on UL grant is received in an $N^{th}$ subframe, an UL grant being the indication target of the DCI that is received after a time point of the $N^{th}$ subframe may correspond to an uplink grant that is received during a duration starting from a reception point of a nearest polling on uplink grant before the $N^{th}$ subframe to an $(N-1)^{th}$ subframe. In other words, by adjusting an interval between two polling on UL grants that are received by the UE, the data retransmission duration may be adjusted. Hereinafter, a detailed example of this procedure will be described below.

(Example #1-1-2) For example, the NA-RETX may be indicated per subframe (group) within a subframe window (RETX_SFWIN).

Herein, for example, in case the corresponding rule is applied, a field (or fields) for NA-RETX indication per subframe (group) index (within a RETX_SFWIN) within the NA-RETXINDI may be defined.

Herein, for example, (in the present invention) a "subframe (group) index" wording may also be interpreted as a finally derived index after performing re-indexing if the subframes included in the RETX_SFWIN.

Herein, for example, interconnected subframe (group) indexes per field (index) may be configured in accordance with a pre-defined rule (e.g., a structure of (implicitly) mapping a relatively low (or high) subframe (group) index to a relatively low field index) and/or may be signaled (e.g., RRC SIGNALING) from the (base station).

Herein, for example, a NA-RETX indication target subframe window size (RETX_SFWINSIZE) may be signaled (e.g., RRC SIGNALING) from the (base station) and/or may be signaled via (field defined for the corresponding purpose within) the NA-RETXINDI (or a newly defined indicator).

As another example, in case a counter (SCH_CNT) field indicating a scheduling index within the UL GRANT (e.g., a function similar to the (conventional) "DOWNLINK ASSIGNMENT INDEX (DAI)" field) is defined, a last counter value (LAST_CVAL) (related to retransmission triggering) may be signaled (through a pre-defined field) within the NA-RETXINDI (e.g., (in this case) the UL GRANT of "0~(LAST_CVAL−1)" counter values becomes a NA-RETX (synchronous) triggering target).

Herein, for example, a SCH_CNT value may be configured to be initialized after a NA-RETXINDI transmission/reception.

Herein, for example, by doing so, signaling of (A) dynamic shift(/indication) of RETX_SFWIN (and/or RETX_SFWINSIZE) and/or (B) information on a number of (total) HARQ PROCESS (GROUP) IDs (or subframe (groups)) in which presence or absence of the NA-RETX is to be indicated via the (corresponding) NA-RETXINDI can be performed.

As another example, in case a "POLLING ON/OFF" field (e.g., "1=ON", "0=OFF") is defined within the UL GRANT, if "UL GRANT W/POLLING ON/OFF=1" is received at a SF #N time point, (A) the UL GRANT being the NA-RETX (presence or absence) indication target of the NA-RETX-INDI, which is received (earliest) after a time point including the SF #N (or SF #(N+1)) time point, is defined(/assumed) as (all) UL GRANT being received during a duration starting from a "UL GRANT W/POLLING ON/OFF=1" reception point (SF #K), which is positioned at a nearest point before the SF #N time point, to a SF #(N−1) time point (or a duration starting from a SF #(K+1) time point to a SF #N time point) and/or (B) the RETX_SFWIN of the NA-RETXINDI, which is received (earliest) after a time point including the SF #N (or SF #(N+1)) time point becomes a duration starting from the SF #K time point to the SF #(N−1) time point (or a duration starting from the SF #(K+1) time point to the SF #N time point).

Figure 12:
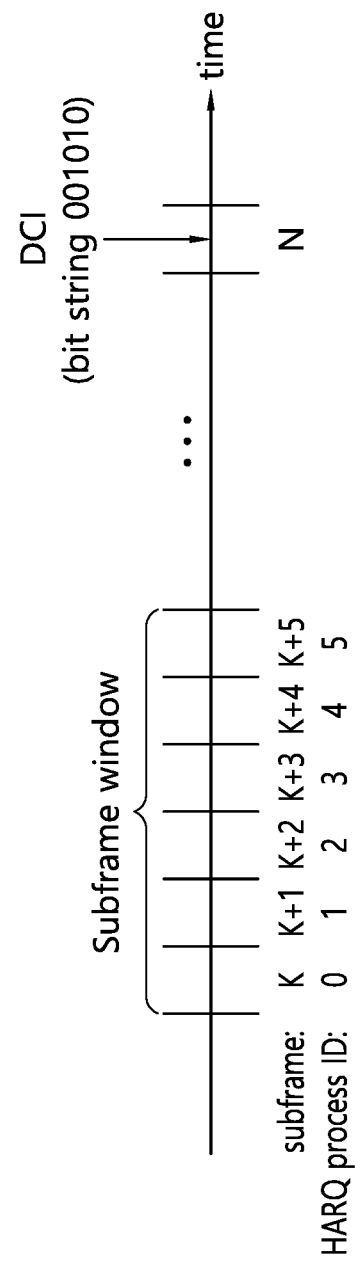
FIG. 12 shows a general view of a data retransmission method according to an exemplary embodiment of the present invention.

FIG. 12 shows a general view of a data retransmission method according to an exemplary embodiment of the present invention.

According to FIG. 12, for example, 6 HARQ process IDs may exist, such as HARQ process IDs #0, #1, #2, #3, #4, and #5. Herein, the UE may receive the DCI in subframe N. Herein, for example, data retransmission for subframes K, K+1, K+2, K+3, K+4, and K+5 via DCI may be considered. Herein, HARQ process IDs #0 to #5 may be serially configured to correspond to subframes K to K+5. Herein, for example, when the UE receives a bit sequence of 001010 through the received DCI, the UE may perform retransmission for HARQ process IDs #2 and #4.

Additionally, herein, for example, a duration starting from subframes K to K+5 may be configured as a subframe window via the received DCI, and retransmission per subframe within the window may be indicated via the received DCI.

Figure 13:
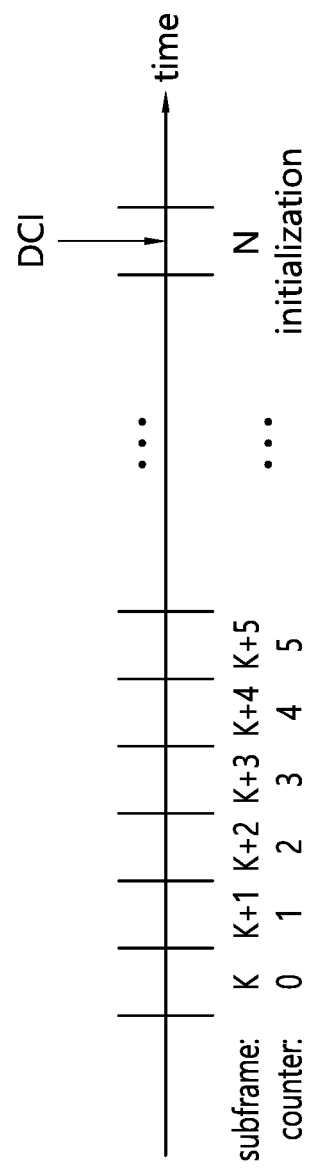
FIG. 13 shows a general view of a data retransmission method according to an exemplary embodiment of the present invention.

FIG. 13 shows a general view of a data retransmission method according to an exemplary embodiment of the present invention.

According to FIG. 13, the UE may receive the DCI in the $N^{th}$ subframe. Herein, for example, scheduling may be performed by the uplink (UL) grant for the $K^{th}$ subframe to the $(K+4)^{th}$ subframe. Herein, in case a counter field indicating a scheduling index within the uplink (UL) grant is defined, counter values of 0, 1, . . . , 5 may be respectively assigned to subframe K to subframe K+4. Herein, by signaling a last counter value from the received DCI, retransmission may be performed for all of the data being transmitted from the $K^{th}$ subframe to the $(K+4)^{th}$ subframe.

Herein, whether or not the retransmitted data is actually received by the network is not a subject for consideration. Herein, for example, the counter value is initialized after the DCI reception, and, by adjusting the transmission time point of the DCI, excessive data retransmission may be prevented.

Figure 14:
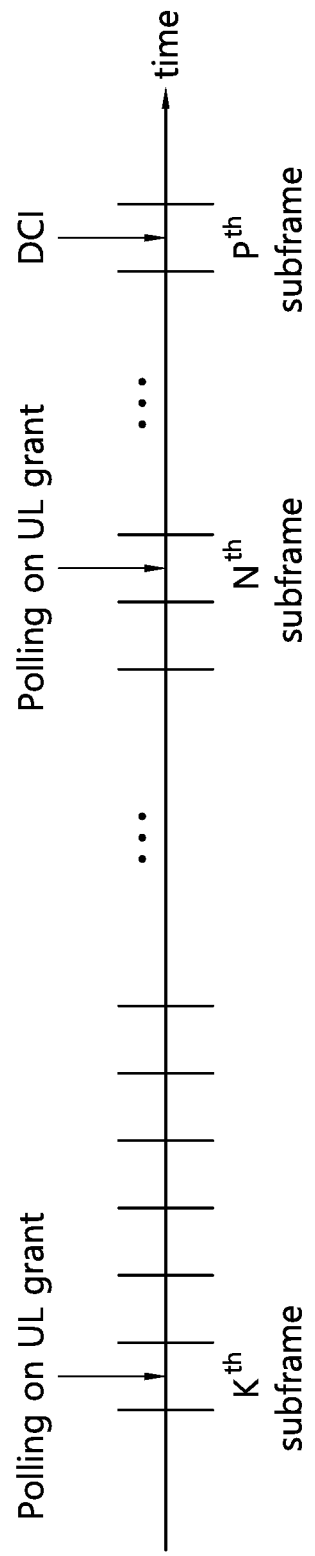
FIG. 14 shows a general view of a data retransmission method according to an exemplary embodiment of the present invention.

FIG. 14 shows a general view of a data retransmission method according to an exemplary embodiment of the present invention.

According to FIG. 14, the UE receives a polling on UL grant from the $N^{th}$ subframe. Herein, the subframe that receives the nearest polling on uplink grant before the $N^{th}$ subframe may correspond to a $K^{th}$ subframe (wherein K<N). Additionally, herein, the subframe that receives the nearest DCI after the $N^{th}$ subframe may correspond to a $P^{th}$ subframe (wherein P>N). Herein, the UL grant that corresponds to a retransmission target being indicated by the DCI, which is received by the $P^{th}$ subframe, may correspond to a UL grant being received during a duration starting from a time point of the $K^{th}$ subframe to a time point of the $(N-1)^{th}$ subframe (wherein N−1>K).

As described above, the DCI may correspond to a UE-specific DCI or a UE-common DCI. Hereinafter, a detailed example of this procedure will be described below.

(Example #1-2) For example, the NA-RETXINDI may be configured(/defined) to have a "UE-SPECIFIC DCI" structure.

Herein, for example, a payload size of the corresponding NA-RETXINDI may be configured(/defined) to be the same as the (general) UL GRANT (e.g., DCI FORMAT 0(/4)) (for example, (in this case,) whether the configuration corresponds to the (general) UL GRANT or the NA-RETXINDI is determined based on a "FLAG FIELD", which is pre-defined (within the NA-RETXINDI)) and/or the payload size may be independently configured(/defined).

For example, the NA-RETXINDI may be configured(/defined) to have a "UE (GROUP)-COMMON DCI" structure. Herein, for example, in case of applying the corresponding rule, NA-RETXINDI, which is similar to the (conventional) "DCI FORMAT 3/3A", may independently trigger a NA-RETX per UE, in state where different MULTI-BITs are assigned to multiple UEs within a single DCI.

As described above, the DCI may include at least any one of a non-adaptive retransmission on/off field, a non-adaptive retransmission timing field, a redundancy version (RV) field, and an aperiodic channel state information (CSI) transmission request field. Hereinafter, a detailed example of this procedure will be described below.

(Example #1-3) For example, (part of) the following fields may be defined (per UE) within the NA-RETXINDI.

Herein, for example, according to the number of data transmissions (of different HARQ PROCESS (GROUP) IDs) that are actually performed in the RETX_SFWIN, a (total) number of specific fields that are to be defined within the NA-RETXINDI may be changed. (For example, in case "N" number of actual data transmissions (of different HARQ PROCESS (GROUP) IDs) are performed within the RETX_SFWIN, (a total of) "N" number of "NA-RETX ON/OFF" fields may be defined(/configured) within the NA-RETXINDI.)

"NA-RETX ON/OFF (e.g., operationally equivalent to PHICH A/N(acknowledgement/not-acknowledgement))" field Herein, for example, "1-BIT" may be assigned per HARQ PROCESS (GROUP) ID (or subframe (group)).

"NA-RETX TIMING" field

Herein, for example, (A) a (separate) "NA-RETX TIMING" field may be configured(/defined) per HARQ PROCESS (GROUP) ID (or subframe (group)) and/or (B) only one (main) "NA-RETX TIMING" field may be configured (/defined), and, based on the indicated (NA-RETX) timing, the NR-RETX may be serially performed (within a time domain) in an increasing (or decreasing) format of the HARQ PROCESS (GROUP) ID (or subframe (group) index).

As another example, a (semi-persistently) fixed (NA-RETX) timing that is configured(/signaled (e.g., via RRC SIGNALING)) in advance may be applied, without any separate "NA-RETX TIMING" field configuration(/definition) within the NA-RETXINDI.

Herein, for example, the corresponding (NA-RETX) timing may be differently (or identically) designated per HARQ PROCESS (GROUP) ID (or subframe (group) index).

"REDUNDANCY VERSION (RV)" field

Herein, for example, (A) a (separate) "RV" field may be configured(/defined) per HARQ PROCESS (GROUP) ID (or subframe (group)) and/or (B) only one (main) "RV" field may be configured(/defined), and, the indicated RV value may be commonly applied to all HARQ PROCESS (GROUP) ID (or subframe) related NA-RETX.

As another example, a (semi-persistently) fixed RV value that is configured(/signaled (e.g., via RRC SIGNALING)) in advance may be applied, without any separate "RV" field configuration(/definition) within the NA-RETXINDI.

Herein, for example, the corresponding RV value may be differently (or identically) designated per HARQ PROCESS (GROUP) ID (or subframe (group) index).

"APERIODIC CSI(/SRS) TRANSMISSION REQUEST" field

Herein, for example, in case the APERIODIC CSI(/SRS) transmission is requested, (A) all NA-RETX(S) (being (synchronously) triggered to the corresponding NA-RETXINDI) may be configured to apply the APERIODIC CSI(/SRS) transmission and/or (B) specific (or part of) NA-RETX information to which the APERIODIC CSI(/SRS) transmission is to be applied may be configured to be signaled through (fields defined for the corresponding purpose within) the NA-RETXINDI (or a newly defined indicator) and/or (C) the APERIODIC CSI(/SRS) transmission may be applied only to a (single) specific NA-RETX (e.g., first (or last) NA-RETX) that is pre-configured(/signaled (e.g., via RRC SIGNALING)) in advance.

"(NA-RETX related) HARQ PROCESS (GROUP) ID (or SUBFRAME (GROUP) INDEX)" field

"NUMBER OF TOTAL HARQ PROCESS (GROUP) ID (or SUBFRAME (GROUP)) INTENDED TO INDICATE (PERFORMANCE OR NON-PERFORMANCE OF) NA-RETX (WITHIN NA-RETXINDI)" field "(NA-RETX related) DM-RS CYCLIC SHIFT (CS) INDEX" field (and/or "(NA-RETX related) TRANSMISSION POWER COMMAND" field and/or "(NA-RETX related) (ANALOG) BEAM RELATED INFORMATION" field and/or "(NA-RETX related) CARRIER (or (SUB)BAND) (INDEX) INDICATOR" field (and/or "(retransmission related) MCS" field and/or "(retransmission) related (frequency) RESOURCE ALLOCATION" field))

As described above, a radio network temporary identifier (RNTI) value that is related to the detection of the DCI may be independently signaled. Additionally, a transmission-related parameter within a search space for the DCI may be predetermined in advance. Hereinafter, a detailed example of this procedure will be described below.

(Example #1-4) For example, a NA-RETXINDI (blind) detection related RNTI value may be signaled independently (or differently) (from a (C−)RNTI value (being used for the conventional DCI (having the same payload size) (e.g., DCI FORMAT 0(/4))). For example, a NA-RETXINDI transmission(/detection) related parameter (e.g., (E)PDCCH CANDIDATE LOCATION, (lowest) AGGREGATION LEVEL (AL), number of blind decoding per AL, etc.) within a (UE-SPECIFIC or (UE GROUP) COMMON) SEARCH SPACE (SS) may be configured(/signaled (e.g., via RRC SIGNALING)) in advance.

Additionally, in case the UE receives both the DCI and uplink grant for the same HARQ process ID, retransmission may be performed in accordance with the uplink grant. Hereinafter, a detailed example of this procedure will be described below.

(Example #1-5) For example, in case the UE receives all of the (above-described) NA-RETXIND (indicating retransmission) and (general) (A-RETX) UL GRANT (e.g., DCI FORMAT 0(/4)), for the same HARQ PROCESS (GROUP) ID (or subframe (group) index), the UE may be configured to perform retransmission in accordance with the (A-RETX) UL GRANT (or NA-RETXINDI).

Herein, for example, in case the corresponding rule is applied, as compared to the NA-RETXINDI, the (A-RETX) UL GRANT may be interpreted to have a relatively higher (or lower) priority level (in light of retransmission indication).

As described above, an HARQ acknowledgement (ACK) transmission timing field may be configured per HARQ process ID within the DCI. Hereinafter, a detailed example of this procedure will be described below.

[Proposed Method #2] For example, in case (part of) the above-described proposed methods are applied to the NA-RETX (and/or A-RETX) for a plurality of downlink data, (part of) the following rules may be (additionally) applied.

(Example #2-1) For example, retransmission related HARQ-ACK transmission timing (HQTX_TIMING) may be determined according to (part of) the following rules.

(Rule #2-1-1) For example, within the NA-RETXINDI, (A) a (separate) "HQTX_TIMING" field may be configured (/defined) per HARQ PROCESS (GROUP) ID (or subframe (group)) and/or (B) only one (main) "HQTX_TIMING" field may be configured(/defined), and, based on the indicated HARQ-ACK transmission timing, the HARQ-ACK transmission may be serially performed (within a time domain) in an increasing (or decreasing) format of the HARQ PROCESS (GROUP) ID (or subframe (group) index) and/or (c) "AGGREGATION" may be performed on the indicated the HARQ-ACK transmission timing and the HARQ-ACK corresponding to all HARQ PROCESS (GROUP) ID (or subframe (group) index) (being (synchronously) (retransmission) triggered to the corresponding NA-RETXINDI) corresponding to all HARQ PROCESS (GROUP) ID (or subframe (group) index), and, then, the aggregation result may be transmitted.

As another example, a (semi-persistently) fixed HARQ-ACK transmission timing that is configured(/signaled (e.g., via RRC SIGNALING)) in advance may be applied, without any separate "HQTX_TIMING" field configuration(/definition) within the NA-RETXINDI. Herein, for example, the corresponding HARQ-ACK transmission timing may be differently (or identically) designated per HARQ PROCESS (GROUP) ID (or subframe (group) index).

As described above, an acknowledgement/not-acknowledgement (A/N) resource indicator (ARI) field may be configured per HARQ process ID within the DCI, and a physical uplink control channel (PUCCH) resource may be assigned based on the ARI. Hereinafter, a detailed example of this procedure will be described below.

(Example #2-2) For example, retransmission related "PUCCH RESOURCE (PUCCH_RSC)" may be determined according to (part of) the following rules.

(Rule #2-2-1) For example, within the NA-RETXINDI, (A) a (separate) "A/N RESOURCE INDICATOR (ARI)" field may be configured(/defined) per HARQ PROCESS (GROUP) ID (or subframe (group)) and/or (B) only one (main) "ARI" field may be configured(/defined), and, the PUCCH_RSC corresponding to indicated ARI may be commonly assigned to all HARQ PROCESS (GROUP) ID (or subframe (group) index) (being (synchronously) (retransmission) triggered to the corresponding NA-RETXINDI).

As another example, a (semi-persistently) fixed PUCCH_RSC that is configured(/signaled (e.g., via RRC SIGNALING)) in advance may be assigned, without any separate "ARI" field configuration(/definition) within the NA-RETXINDI.

Herein, for example, the corresponding PUCCH_RSC may be differently (or identically) designated per HARQ PROCESS (GROUP) ID (or subframe (group) index).

Figure 15:
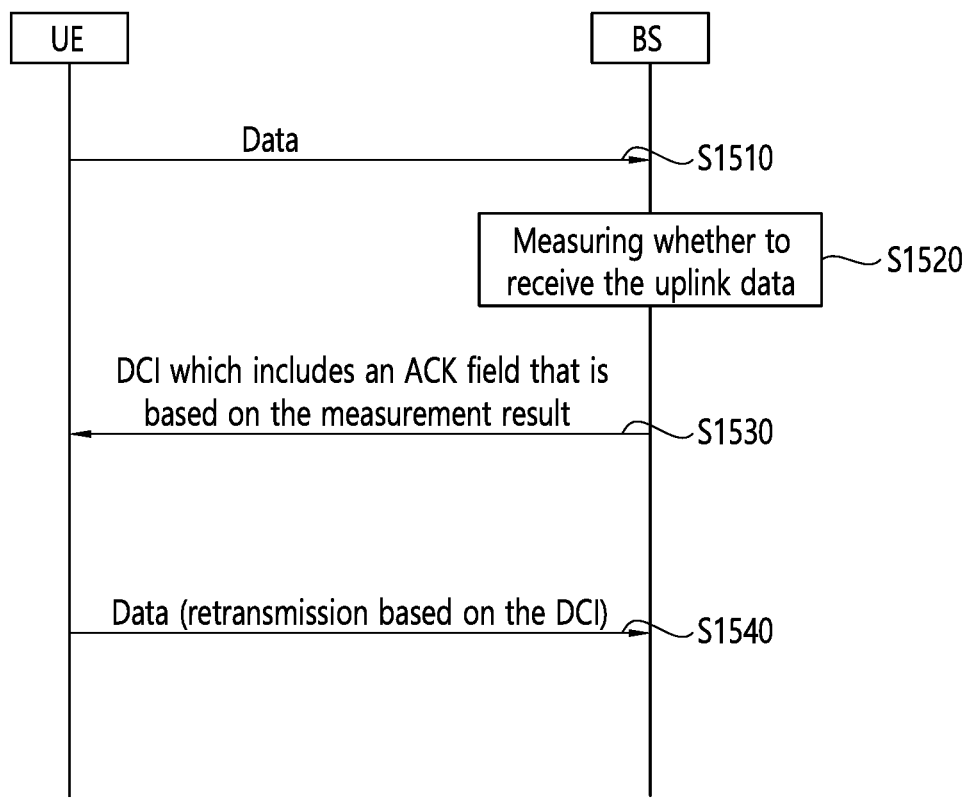
FIG. 15 shows a detailed example of applying the method of FIG. 11.

FIG. 15 shows a detailed example of applying the method of FIG. 11.

According to FIG. 15, a user equipment (UE) transmits uplink data to a base station (S1510).

Afterwards, the base station measures whether to receive the uplink data or not (S1520).

Subsequently, the base station transmits DCI, which includes an acknowledgement (ACK) field that is based on the measurement result, to the UE (S1530).

Thereafter, the UE retransmits data based on the DCI (S1540). Herein, for example, the retransmission may correspond to non-adaptive retransmission. Additionally, for example, the DCI may indicate retransmission per HARQ process ID. Additionally, for example, the DCI may indicate retransmission per subframe within a subframe window. Additionally, for example, in case a counter field indicating a scheduling index within the uplink (UL) grant is defined, the DCI may signal a last counter value. Additionally, for example, in case a polling on/off field is defined within the UL grant, and, when a polling on UL grant is received in an $N^{th}$ subframe, an UL grant being the indication target of the DCI that is received after a time point of the $N^{th}$ subframe may correspond to an uplink grant that is received during a duration starting from a reception point of a nearest polling on uplink grant before the $N^{th}$ subframe to an $(N-1)^{th}$ subframe. Additionally, for example, the DCI may correspond to a UE-specific DCI or a UE-common DCI. Additionally, for example, the DCI may include at least any one of a non-adaptive retransmission on/off field, a non-adaptive retransmission timing field, a redundancy version (RV) field, and an aperiodic channel state information (CSI) transmission request field. Additionally, for example, a radio network temporary identifier (RNTI) value that is related to the detection of the DCI may be independently signaled. Additionally, for example, a transmission-related parameter within a search space for the DCI may be predetermined in advance. Additionally, for example, in case the UE receives both the DCI and uplink grant for the same HARQ process ID, retransmission may be performed in accordance with the uplink grant. Additionally, for example, an HARQ ACK transmission timing field may be configured per HARQ process ID within the DCI. Furthermore, for example, an acknowledgement/not-acknowledgement resource indicator (ARI) field may be configured per HARQ process ID within the DCI.

Herein, since the detailed example of retransmitting data by the UE is the same as the description presented above, a detailed description of the same will be omitted for simplicity.

Figure 16:
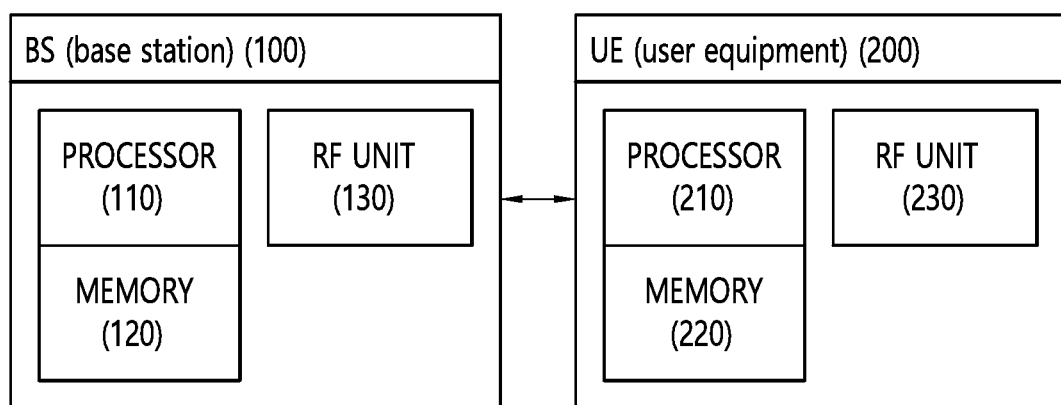
FIG. 16 is a block diagram illustrating a communication device in which embodiments of the present invention are implemented.

FIG. 16 is a block diagram illustrating a communication device in which embodiments of the present invention are implemented.

Referring to FIG. 16, the BS 100 includes a processor 110, memory 120, and a Radio Frequency (RF) unit 130. The processor 110 implements the proposed functions, processes and/or methods. The memory 120 is connected to the processor 110, and the memory stores various types of information for driving the processor 110. The RF unit 130 is connected to the processor 110, and the RF unit sends and/or receives radio signals.

The user equipment (UE) 200 may include a processor 210, memory 220, and a RF unit 230. The processor 210 implements the proposed functions, processes and/or methods. For example, the processor 210 may receive the uplink communication related parameters set independently for each analog beam, and apply the parameters to perform the uplink communication. Herein, when the uplink communication is performed using a specific analog beam, the uplink communication related parameter set in the specific analog beam may be applied to the uplink communication. The memory 220 is connected to the processor 210, and the memory stores various types of information for driving the processor 210. The RF unit 230 is connected to the processor 210, and the RF unit sends and/or receives radio signals.

The processor 110, 210 may include Application-Specific Integrated Circuits (ASICs), other chipsets, logic circuits, data processors and/or converters for converting baseband signals and radio signals. The memory 120, 220 may include Read-Only Memory (ROM), Random Access Memory (RAM), flash memory, memory cards, storage media and/or other storage devices. The RF unit 130, 230 may include one or more antennas for sending and/or receiving radio signals. When the embodiment is implemented in software, the above-described scheme may be implemented as a module (process, function, etc.) for performing the above function. The module may be stored in the memory 120, 220 and executed by the processor 110, 210. The memory 120, 220 may be placed inside or outside the processor 110, 210 and connected to the processor 110, 210 using a variety of well-known means.

Since the examples of the above-described proposed methods may be included as one of the implementation methods of the present invention, it will be apparent that the corresponding example can be viewed (and understood) as one of the proposed methods. Additionally, although the proposed methods, which are described above, may be implemented independently, the present invention may also be implemented to a combined (or integrated) structure of part of the proposed methods. For example, the scope of systems adopting the proposed methods of the present invention may be extended to systems other than the 3GPP LTE system.

The above-described exemplary embodiment included diverse examples. It will be apparent to anyone skilled in the art that a combination of all possible examples of the present invention cannot be fully described, and it will also be apparent to anyone skilled in the art that the other combinations may be derived from the detailed description of the specification presented herein. Therefore, the scope of the present invention shall be understood and determined by combining the diverse examples presented in the detailed description of the present invention, without departing from the scope and spirit of the present invention.

What is claimed is:

1. A method of receiving acknowledgement/negative acknowledgement (ACK/NACK) information by a user equipment (UE) in a wireless communication system, the method comprising:
   receiving, from a network, first downlink control information (DCI) including an uplink (UL) grant;
   transmitting, to the network, uplink data; and
   receiving, from the network, second DCI for feedback on the uplink data,
   wherein the second DCI includes the ACK/NACK information on the uplink data and a transmission power control (TPC) command for retransmission scheduled by the second DCI,
   wherein the ACK/NACK information relates to a plurality of hybrid automatic repeat request (HARQ) process identifiers (IDs), wherein the ACK/NACK information comprises a plurality of bits,
wherein each of the plurality of the HARQ process IDs is related to a corresponding one of the plurality of bits in ascending order,
wherein a payload size of the second DCI is a same size as a payload size of the first DCI, and
wherein the second DCI is identified based on a flag in the second DCI.

2. The method of claim 1, further comprising:
retransmitting, to the network, the uplink data, wherein the retransmission is a non-adaptive retransmission.

3. The method of claim 1, wherein the second DCI informs the UE of retransmission per subframe within a subframe window.

4. The method of claim 1, wherein based on a counter field informing the UE of a scheduling index within an uplink (UL) grant, the second DCI signals a last counter value.

5. The method of claim 4, wherein the counter value is initialized when the second DCI is received.

6. The method of claim 1, wherein based on a polling on/off field defined within an uplink grant, and when a polling on an UL grant is received in an Nth subframe, wherein N is a positive integer, the UL grant being a target of the second DCI that is received after a time point of the Nth subframe is received in a time duration starting from a reception point of a nearest polling on uplink grant before the Nth subframe to an (N-1)th subframe.

7. The method of claim 1, wherein the second DCI is a UE-specific DCI or a UE-common DCI.

8. The method of claim 1, wherein the second DCI includes at least one of a non-adaptive retransmission on/off field, a non-adaptive retransmission timing field, a redundancy version (RV) field, and/or an aperiodic channel state information (CSI) transmission request field.

9. The method of claim 1, wherein a radio network temporary identifier (RNTI) value related to a detection of the second DCI is independently signaled.

10. The method of claim 1, wherein a transmission-related parameter within a search space for the second DCI is predetermined.

11. The method of claim 1, wherein, based on receiving both the second DCI and uplink grant for a same HARQ process ID, retransmission is performed in accordance with the uplink grant.

12. The method of claim 1, wherein an ACK/NACK transmission timing field is configured per HARQ process ID within the second DCI.

13. The method of claim 1, wherein an ACK/NACK resource indicator (ARI) field is configured per HARQ process ID within the second DCI.

14. The method of claim 1, wherein the second DCI does not include resource allocation information.

15. A communication device for receiving acknowledgement/negative acknowledgement (ACK/NACK) information in a wireless communication system, the communication device comprising:
one or more antennas for transmitting and receiving radio signals; and
a processor operatively coupled to the one or more antennas, and configured to control the one or more antennas to:
receive, from a network, first downlink control information (DCI) including an uplink (UL) grant,
transmit, to the network, uplink data,
receive, from the network, second DCI for feedback on the uplink data,
wherein the second DCI includes the ACK/NACK information on the uplink data and a transmission power control (TPC) command for retransmission scheduled by the second DCI,
wherein the ACK/NACK information relates to a plurality of hybrid automatic repeat request (HARQ) process identifiers (IDs),
wherein the ACK/NACK information comprises a plurality of bits,
wherein each of the plurality of the HARQ process IDs is related to a corresponding one of the plurality of bits in ascending order,
wherein a payload size of the second DCI is a same size as a payload size of the first DCI, and
wherein the second DCI is identified based on a flag in the second DCI.

16. A method of transmitting acknowledgement/negative acknowledgement (ACK/NACK) information by a base station in a wireless communication system, the method comprising:
transmitting, to a user equipment (UE), first downlink control information (DCI) including an uplink (UL) grant;
receiving, from the UE, uplink data; and
transmitting, to the UE, second DCI for feedback on the uplink data,
wherein the second DCI includes the ACK/NACK information on the uplink data and a transmission power control (TPC) command for retransmission scheduled by the second DCI,
wherein the ACK/NACK information relates to a plurality of hybrid automatic repeat request (HARQ) process identifiers (IDs),
wherein the ACK/NACK information comprises a plurality of bits,
wherein each of the plurality of the HARQ process IDs is related to a corresponding one of the plurality of bits in ascending order,
wherein a payload size of the second DCI is a same size as a payload size of the first DCI, and
wherein the second DCI is identified based on a flag in the second DCI.

17. A communication device for transmitting acknowledgement/negative acknowledgement (ACK/NACK) information in a wireless communication system, the communication device comprising:
one or more antennas for transmitting and receiving radio signals; and
a processor operatively coupled to the one or more antennas, and configured to control the one or more antennas to:
transmit, to a user equipment (UE), first downlink control information (DCI) including an uplink (UL) grant,
receive, from the UE, uplink data,
transmit, to the UE, second DCI for feedback on the uplink data,
wherein the second DCI includes the ACK/NACK information on the uplink data and a transmission power control (TPC) command for retransmission scheduled by the second DCI,
wherein the ACK/NACK information relates to a plurality of hybrid automatic repeat request (HARQ) process identifiers (IDs),
wherein the ACK/NACK information comprises a plurality of bits, wherein each of the plurality of the HARQ process IDs is related to a corresponding one of the plurality of bits in ascending order, wherein a payload size of the second DCI is a same size as a payload size of the first DCI, and wherein the second DCI is identified based on a flag in the second DCI.

* * * * *